Patented Sept. 3, 1935

2,013,340

UNITED STATES PATENT OFFICE 2,013,340

MANUFACTURE OF SOLDER

James E. Dempsey, Detroit, Mich.

No Drawing. Application April 6, 1935,
Serial No. 15,094

4 Claims. (Cl. 75—1)

This invention relates to the manufacture of solder and particularly solder for soldering non-ferrous alloys such as aluminum, monel metal, duralumin or the like. A successful and practical solder for aluminum, particularly has been sought for some time. A number of so-called aluminum solders have been on the market, but their use has met with indifferent success.

The principal object of the present invention is to provide a new and improved solder for aluminum and its alloys, which will produce clean strong joints, free from dross.

A further object of the invention is to provide a solder that will melt easily and flow smoothly when applied to such a surface and have high adhesive strength.

A still further object is to provide such a solder that may be successfully used by an inexperienced user with complete success.

The above and other objects will appear from the following more detailed description:

In carrying out the process it is recommended that the metals be melted in a container having a valve opening in the bottom thereof. Into this container is placed a quantity of sodium cyanide. The sodium cyanide is then heated until it becomes molten. Into the molten sodium cyanide is deposited zinc and aluminum in quantities proportional to 95% zinc to 5% aluminum. After the zinc and aluminum have melted, the sodium cyanide, having a specific gravity less than the zinc and aluminum, floats upon the surface and forms a molten layer on the melted solder.

As to the function of the sodium cyanide, it is of course apparent that it functions as a protective coating and prevents oxidation of the metals of the solder during the heating preparation, which may be its most important, but is believed not to be its only function, inasmuch as other salts have been tried, but when utilized in the same way, seem to fall short of sodium cyanide in the results obtained. It may be, therefore, that a chemical reaction takes place between one or both of the metals and this particular salt which results in imparting to the finished solder greatly enhanced flowing and holding characteristics.

After thorough intermixture the valve in the bottom of the container is opened and the metal run into molds where it may cool quickly, the valve being closed before the overlaying molten sodium cyanide can follow through.

Another variation is to let the metals, covered by the protective coating of sodium cyanide, cool in the melting container, after which the sodium cyanide may be broken away or washed out with water, the resulting mass of solder being cut up into rods or bars for use.

The method first above described has been found by experiment and commercial use to be the most economical in time and materials.

In using this improved solder, no flux is necessary, and it will be found to flow upon and adhere to aluminum and many other metals merely when melted thereon.

While I have described a satisfactory, commercial example, embodying the principles of the present invention, it will be understood that many changes, variations and modifications may be resorted to without departing from such principles.

I claim:

1. The process of manufacturing of non-ferrous solder which comprises melting and alloying zinc and aluminum beneath a protecting coating of sodium cyanide and maintaining the metals beneath said coating until the alloying has been substantially completed.

2. The process of manufacture of non-ferrous solder which comprises melting zinc and aluminum and maintaining them beneath a protecting layer of molten sodium cyanide throughout substantially the entire period during which said metal is maintained in molten condition.

3. The process of manufacturing solder comprising the alloying of non-ferrous metals comprising approximately 95% zinc and 5% aluminum in a bath of molten sodium cyanide.

4. The process of manufacturing solder comprising the alloying of zinc and aluminum in the proportion of approximately 95% zinc to 5% aluminum in a protecting bath of molten sodium cyanide.

JAMES E. DEMPSEY.